(12) United States Patent
Byun (10) Patent No.: US 10,637,260 B2
(45) Date of Patent: Apr. 28, 2020

(54) APPARATUS AND METHOD FOR CONTROLLING RAPID CHARGING OF A VEHICLE

(71) Applicants: HYUNDAI MOTOR COMPANY, Seoul (KR); KIA MOTORS CORPORATION, Seoul (KR)

(72) Inventor: Young Chan Byun, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 263 days.

(21) Appl. No.: 15/709,148

(22) Filed: Sep. 19, 2017

(65) Prior Publication Data

US 2018/0294660 A1 Oct. 11, 2018

(30) Foreign Application Priority Data

Apr. 6, 2017 (KR) .................. 10-2017-0044745

(51) Int. Cl.
| | |
|---|---|
| *H02J 7/00* | (2006.01) |
| *B60L 11/18* | (2006.01) |
| *B60L 3/00* | (2019.01) |
| *B60L 3/04* | (2006.01) |
| *B60L 53/14* | (2019.01) |
| *B60L 53/10* | (2019.01) |

(52) U.S. Cl.
CPC .......... *H02J 7/0029* (2013.01); *B60L 3/0046* (2013.01); *B60L 3/0069* (2013.01); *B60L 3/04* (2013.01);

(Continued)

(58) Field of Classification Search
CPC .......... H02J 7/0029; H02J 7/0073; H02J 7/00; B60L 11/185; B60L 11/1816;
(Continued)

(56) References Cited

U.S. PATENT DOCUMENTS

| | | | |
|---|---|---|---|
| 2011/0148355 A1* | 6/2011 | Nakamura ................ | B60L 3/04 320/109 |
| 2011/0210746 A1* | 9/2011 | Yugou ...................... | B60L 3/04 324/427 |

(Continued)

*Primary Examiner* — Edward Tso
*Assistant Examiner* — Dung V Bui
(74) *Attorney, Agent, or Firm* — Lempia Summerfield Katz LLC (57) ABSTRACT

An apparatus for controlling charging of a battery includes a battery unit including a battery, a first relay connected with the battery, and a second relay interposed between the first relay and a rapid charging port to charge the battery with charging power from a rapid charger connected with the rapid charging port, if the first relay and the second relay are controlled to be on. The apparatus includes a charging controller that controls the first relay and the second relay to be on or off and to determine a welding state of the second relay, if the rapid charger is connected with the rapid charging port, to control charging of the battery in a charging sequence corresponding to the welding state of the second relay. A method of controlling charging of a battery includes determining the welding state of the second relay, controlling the first relay to be on or off in a compensation charging sequence, if the second relay is determined to be welded, or controlling the first relay and the second relay to be on or off in a basic charging sequence, if the second relay is not determined to be welded.

20 Claims, 4 Drawing Sheets

(52) U.S. Cl.
CPC ............. *B60L 53/11* (2019.02); *B60L 53/14* (2019.02); *H02J 7/0071* (2020.01); *Y02T 10/7005* (2013.01)

(58) Field of Classification Search
CPC .......... B60L 11/18; B60L 3/0046; B60L 3/04; B60L 3/0069; B60L 3/00; B60L 53/11; B60L 53/14; Y02T 10/7005
USPC ....................................................... 320/109
See application file for complete search history.

(56) References Cited

U.S. PATENT DOCUMENTS

| | | | |
|---|---|---|---|
| 2013/0207461 A1* | 8/2013 | Huh | B60R 16/03 307/10.1 |
| 2014/0016238 A1* | 1/2014 | Tazaki | H01H 47/002 361/88 |
| 2014/0097676 A1* | 4/2014 | Kusumi | H02J 7/045 307/10.1 |
| 2014/0343776 A1* | 11/2014 | Ang | H01M 10/4257 701/22 |
| 2015/0130414 A1* | 5/2015 | Izumi | H02J 7/0029 320/109 |
| 2015/0241500 A1* | 8/2015 | Mochizuki | B60L 53/31 324/418 |
| 2016/0001766 A1* | 1/2016 | Mori | H01M 10/44 701/22 |
| 2016/0059720 A1* | 3/2016 | Yamamoto | B60L 58/21 320/134 |
| 2016/0280082 A1* | 9/2016 | Tajima | H02J 7/0029 |
| 2016/0344131 A1* | 11/2016 | Kanamori | H01R 13/4532 |
| 2016/0347302 A1* | 12/2016 | Niwa | B60L 11/1875 |
| 2017/0001533 A1* | 1/2017 | Niwa | B60L 55/00 |
| 2017/0092023 A1* | 3/2017 | Ishii | G07C 5/0816 |

\* cited by examiner

APPARATUS AND METHOD FOR CONTROLLING RAPID CHARGING OF A VEHICLE

CROSS-REFERENCE TO RELATED APPLICATION

This application is based on and claims the benefit of priority to Korean Patent Application No. 10-2017-0044745, filed on Apr. 6, 2017 in the Korean Intellectual Property Office, the disclosure of which is incorporated herein in its entirety by reference.

BACKGROUND

Technical Field

The present disclosure relates to an apparatus and a method for controlling rapid charging of a vehicle.

Description of Related Art

An eco-friendly vehicle, such as an electric vehicle or a hybrid vehicle, has a high-voltage battery mounted thereon to supply driving power to an electric motor serving as a driving source of the vehicle. For controlling a current applied to the high-voltage battery to protect the high-voltage battery, a relay (main relay) is provided in the eco-friendly vehicle together with the high-voltage battery. Alternatively, a rapid charging relay may be provided to control current between a charger and the high-voltage battery in rapid charging.

In the structure in which the main relay is series-connected with the rapid charging relay, a rapid charger and the high-voltage battery are connected with each other to start charging when both the main relay and the rapid charging relay become on. Therefore, when the main relay is welded, a rapid charging port is not exposed to a high voltage. Accordingly, the structure in which the main relay is series-connected with the rapid charging relay has been employed.

However, in the structure in which the main relay is series-connected with the rapid charging relay, a conventional charging sequence is performed without considering safety, which is the case that the rapid charging relay is welded. In other words, when the rapid charging relay is welded, an inrush current is applied due to the rapid charging, thereby causing damage to the vehicle and/or the charger.

SUMMARY

The present disclosure has been made to solve the above-mentioned problems occurring in the prior art while advantages achieved by the prior art are maintained intact.

An aspect of the present disclosure provides an apparatus and a method for controlling rapid charging of a vehicle by employing a charging sequence to allow the charging without causing damage to the vehicle and/or a charger, even if a rapid charging relay is welded in the structure in which a main relay is series-connected with the rapid charging relay.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling rapid charging of a vehicle includes a battery unit. The battery unit includes: a battery; a first relay connected with the battery; a second relay interposed between the first relay and a rapid charging port to charge the battery with charging power from a rapid charger connected with the rapid charging port, if the first relay and the second relay are controlled to be on. The apparatus for controlling rapid charging includes a charging controller that controls the first relay and the second relay to be on or off and determines a welding state of the second relay to control charging of the battery in a charging sequence corresponding to the welding state of the second relay, if the rapid charger is connected with the rapid charging port.

The charging controller controls the first relay to be on or off in a compensation charging sequence, if the second relay is determined to be welded, or controls the first relay and the second relay to be on or off in a basic charging sequence, if the second relay is not determined to be welded.

The charging controller controls the first relay to be on in a state that a charging connector is locked, determines a DC link voltage of the battery, and controls the first relay to be off if the DC link voltage is equal to a voltage of the battery in the compensation charging sequence.

The charging controller determines the DC link voltage of the battery based on an equipotential value generated from an inverter capacitor parallel-connected with the first relay.

The charging controller inspects for insulation of the rapid charger after controlling the first relay to be off.

The charging controller controls the first relay to be on and starts the charging of the battery, if completely inspecting for the insulation of the rapid charger.

The charging controller inspects for insulation of the rapid charger, controls the first relay and the second relay to be on, and starts the charging of the battery in the basic charging sequence.

The charging controller diagnoses the welding state of the second relay and stores a diagnosis result, if the charging of the battery is completed.

The charging controller determines the welding state of the second relay by calling welding diagnosis information of the second relay, which is stored when the charging of the battery is completed in a previous charging stage of the battery.

The charging controller receives a voltage value from a voltage sensor provided in the second relay and determines the welding state of the second relay based on the received voltage value.

The battery unit further includes an initial charging relay and an initial charging resistor, which are parallel-connected with the first relay, and the initial charging relay and the initial charging resistor are series-connected with each other.

According to another aspect of the present disclosure, a method for controlling rapid charging of a vehicle includes: determining a welding state of a second relay interposed between a first relay and a rapid charging port, if a rapid charger is connected with the rapid charging port in a state that the first relay and the second relay are connected between a battery and the rapid charging port; controlling the first relay to be on or off in a compensation charging sequence, if the second relay is determined to be welded, or controlling the first relay and the second relay to be on or off in a basic charging sequence, if the second relay is not determined to be welded; and controlling charging of the battery.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Hereinafter, embodiments of the present disclosure are described in detail with reference to the accompanying drawings. In the drawings, the same reference numerals are assigned to the same or equivalent elements, although the elements are illustrated in different drawings. In addition, in the following description of the present disclosure, the detailed description of well-known features or functions has been ruled out in order to avoid unnecessarily obscuring the subject matter of the present disclosure.

In the following description of elements according to an embodiment of the present disclosure, the terms 'first', 'second', 'A', 'B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those having ordinary skill in the art to which the present disclosure pertains. Such terms as those defined in a generally used dictionary are to be interpreted as having the same meanings as the contextual meanings in the relevant field of art. Such terms are not to be interpreted as having ideal or excessively formal meanings unless clearly defined as having such in the present application.

Figure 1:
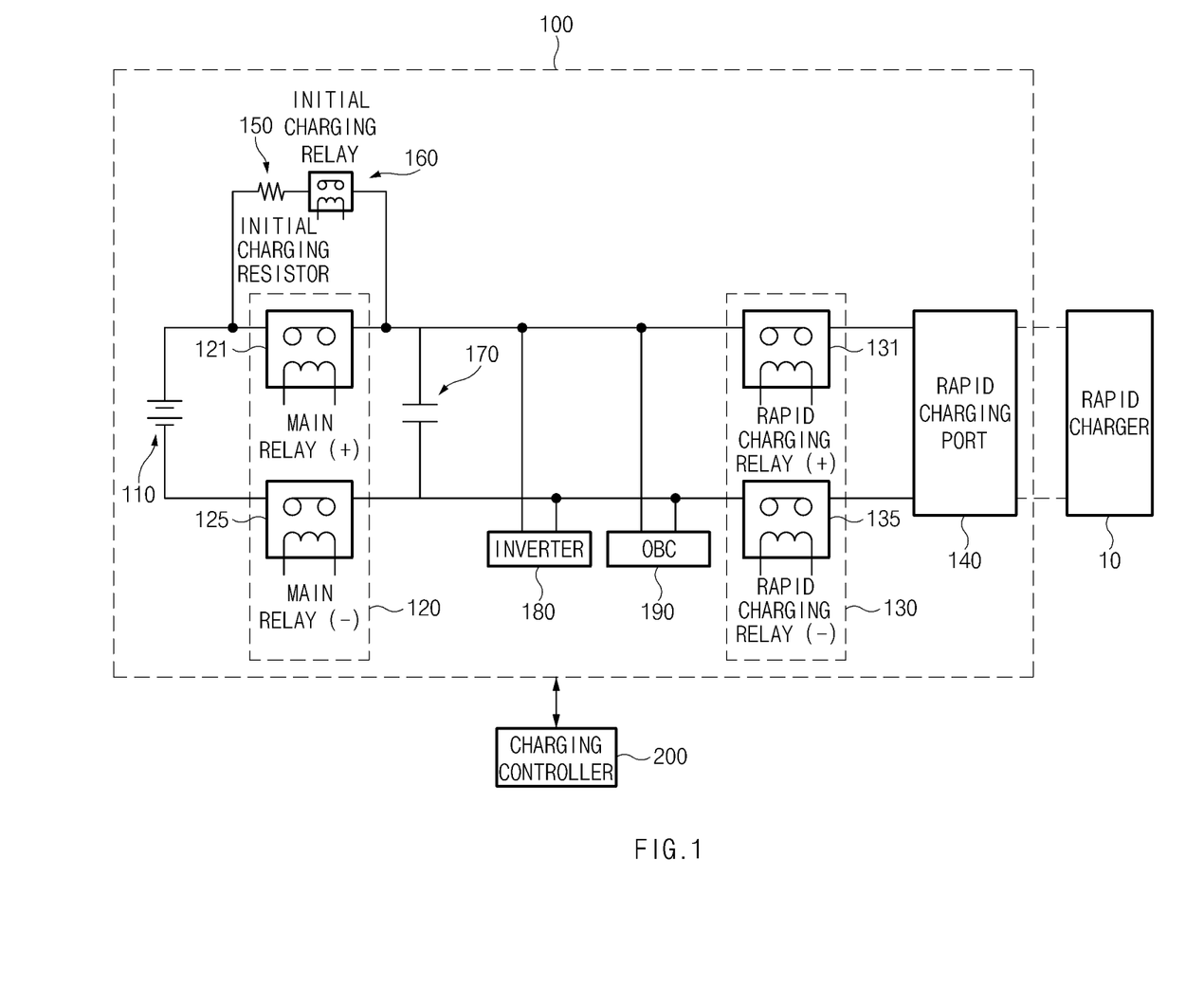
FIG. 1 is a view illustrating the configuration of an apparatus for controlling the charging of a battery, according to an embodiment of the present disclosure.
Figure 2:
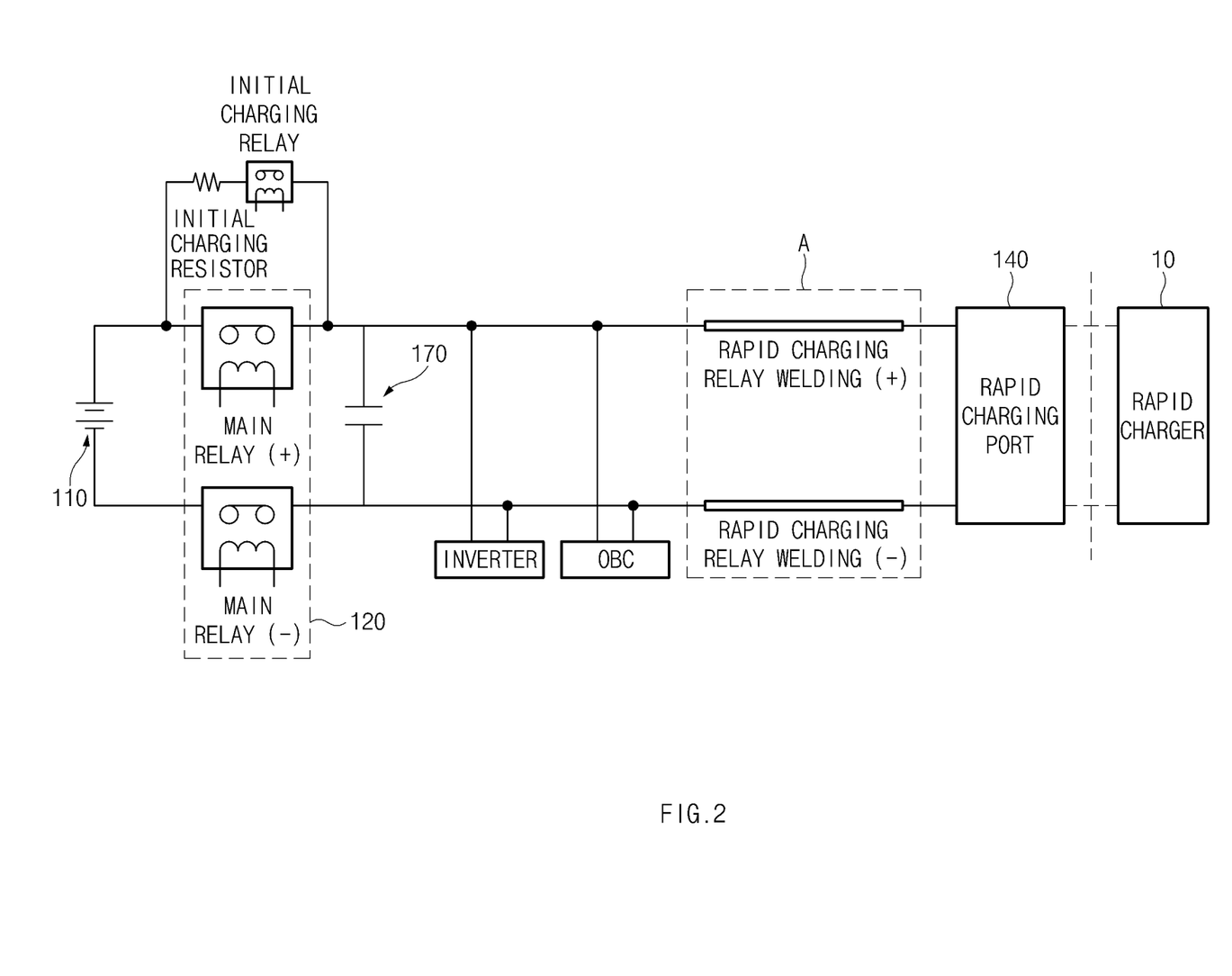
FIG. 2 is a view illustrating the operations of the apparatus of FIG. 1 for controlling the charging of the battery, according to an embodiment of the present disclosure.

FIG. 1 is a view illustrating the configuration of an apparatus for controlling the charging of a battery in a vehicle, according to an embodiment of the present disclosure.

Referring to FIG. 1, according to the present disclosure, the apparatus for controlling the charging of the battery in the vehicle may include a battery unit 100. The battery unit 100 includes a battery 110, a first relay 120, a second relay 130, and a charging controller 200. The charging controller 200 controls the charging of the battery 110 in rapid charging.

The battery 110 may be a high-voltage battery for supplying a driving voltage to a driving unit, such as a motor, of the vehicle. The battery 110 is charged with a charging voltage supplied from a rapid charger 10 if the rapid charger 10 is connected with a rapid charging port 140.

The first relay 120 and the second relay 130 are interposed between the battery 110 and the rapid charging port 140.

The first relay 120, which serves as a main relay, is connected with both electrodes of the battery 110 to control a current input to or output from the battery 110. In this case, the first relay 120 may include a first main relay 121 (main relay (+)) connected with a positive electrode of the battery 110 and a second main relay 125 (main relay (−)) connected with a negative electrode of the battery 110.

An initial charging resistor 150 and an initial charging relay 160 are parallel-connected with the first main relay 121. In the case that an electric circuit is formed by the first relay 120, the initial charging resistor 150 and the initial charging relay 160 block an inrush current through the interaction with an inverter capacitor 170 to prevent the first relay 120 from being welded.

The second relay 130, which serves as a rapid charging relay and is interposed between the first relay 120 and the rapid charging port 140, controls a current flowing between the battery 110 and the rapid charger 10 when the rapid charger 10 is connected with the rapid charging port 140. In this case, the second relay 130 may include a first rapid charging relay (rapid charging relay (+)) 131, which is interposed between the first main relay 121 and the rapid charging port 140, and a second rapid charging relay (rapid charging relay (−)) 135, which is interposed between the second main relay 125 and the rapid charging port 140.

The first relay 120 and the second relay 130 become on in the rapid charging of the battery 110 to transmit charging power from the rapid charger 10 to the battery 110. In this case, the first relay 120 and the second relay 130 are controlled to be sequentially on. In addition, according to a rapid charging manner, the second relay 130 may be controlled to be on after the first relay 120 is on, or the first relay 120 may be controlled to be on after the second relay 130 is on.

In the case of a combo charging manner, the second relay 130 may be controlled to be on after the first relay 120 is on. Alternatively, in the case of a CHAdeMO (CHArge de MOve quick charging method trade name) charging manner or an SGS (trade name) charging manner, the first relay 120 may be controlled to be on after the second relay 130 is on.

In addition, the battery unit 100 may further include an inverter 180 and an on board charger (OBC) 190.

The inverter 180 is interposed between the first relay 120 and the second relay 130 to convert the power of the battery 110 into three-phase power such that the motor (not illustrated) of the vehicle may be driven. In this case, the inverter capacitor 170 may be interposed between the inverter 180 and the first relay 120.

In addition, the OBC 190 is interposed between the first relay 120 and the second relay 130. The OBC 190, which serves as a slow charger, rectifies external alternating current (AC) power and supplies charging power to the battery 110.

In this case, the battery unit 100 may be electrically connected with the charging controller 200. The battery unit 100 may be connected with the charging controller 200 through vehicle network communication, such as controller area network (CAN) communication, local interconnect network (LIN) communication, or Flex-Ray communication.

The charging controller 200 controls the first relay 120 and the second relay 130 to be on or off when rapidly charging the battery 110.

The charging controller 200 determines a welding state of the second relay 130 to rapidly charge the battery 110 if the rapid charger 10 is connected with the rapid charging port 140.

In this case, when rapidly charging the battery 110, the charging controller 200 diagnoses the welding state of the second relay 130 and stores a diagnosis result after the charging is completed. The charging controller 200 may diagnose the welding state of the second relay 130 based on a voltage value output from a voltage sensor (not illustrated) included in the second relay 130.

Therefore, the charging controller 200 calls the diagnosis result for the welding state of the second relay 130, which is stored in a previous rapid charging stage, to determine the welding state of the second relay 130.

If the charging controller 200 does not determine the second relay 130 to be welded, the charging controller 200 controls the first relay 120 and the second relay 130 to be on in a basic charging sequence such that the battery 110 is rapidly charged.

In this case, the basic charging sequence may be a sequence of [locking a charging connector of a rapid charger→inspecting for the insulation of the rapid charger (by applying a voltage of 500 V)→(sequentially) controlling the first relay and the second relay to be on→starting charging].

In the case of the basic charging sequence, the sequence of controlling the first relay 120 and the second relay 130 to be on may be changed according to rapid charging manners, such as CHAdeMO, SGS, or combo charging manners. In addition, an additional operation may be provided to the basic charging sequence according to the rapid charging manners.

For example, if the rapid charging manner is the combo charging manner an initial charging operation of the rapid charger 10 may be added after the inspection for the insulation of the rapid charger 10 (by applying the voltage of 500 V) is completed.

In addition, if the rapid charging manner is the CHAdeMO charging manner or the SGS charging manner, an operation of determining whether the voltage of the rapid charger 10 is less than 10 V may be added before locking the charging connector of the rapid charger 10.

After completing the charging of the battery 110 in the basic charging sequence, the charging controller 200 may diagnose the welding state of the second relay 130 and may store the diagnosis result.

To the contrary, if the charging controller 200 determines the second relay 130 to be welded, in a compensation charging sequence, the charging controller 200 controls the first relay 120 to be on or off to make a DC link voltage approximate to the voltage of the battery 110 and then inspects for the insulation of the rapid charger 10.

In other words, the compensation charging sequence may be a sequence of [locking the charging connector of a rapid charger→controlling the first relay to be on→determining the DC link voltage→controlling the first relay to be off→inspecting for the insulation of the rapid charger (by applying a voltage of 500 V)→controlling the first relay to be on→starting charging]. In addition, an operation may be provided to the compensation charging sequence according to the rapid charging manners. The details of the compensation charging sequence are described later by making reference to the embodiment illustrated in FIG. 3.

In addition, the charging controller 200 may transmit the information on the welding state of the second relay 130 to the outside, if determining the welding state of the second relay 130.

According to the present embodiment, the charging controller 200 may be a battery management system (BMS).

In addition, the charging controller 200 according to the present embodiment may be implemented in the form of an independent hardware device. The charging controller 200 may be provided in the form of at least one processor and driven in the incorporation form into another hardware device such as a micro-processor or a general computer system.

Hereinafter, the operating flow of the apparatus for controlling the charging of the battery according to the present disclosure having the above configuration will be described in more detail.

Figure 3:
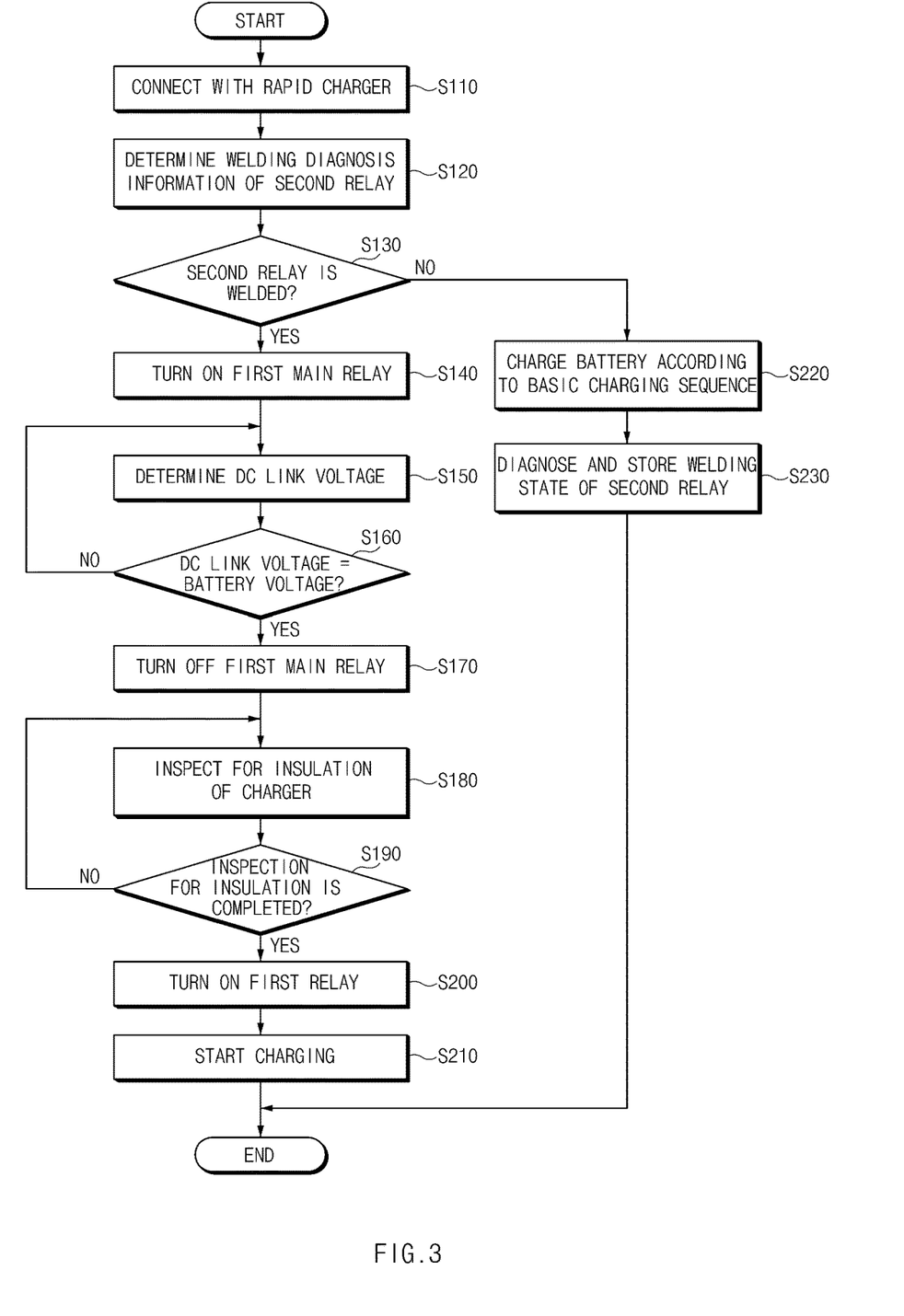
FIG. 3 is a flowchart illustrating operations in a method for controlling the charging of a battery, according to an embodiment of the present disclosure.

FIG. 3 is a flowchart illustrating operations in a method for controlling the rapid charging of the battery, according to an embodiment of the present disclosure.

Referring to FIG. 3, the apparatus for controlling the rapid charging of the vehicle checks the welding diagnosis information of the second relay 130, which is stored in the previous rapid charging stage, (S120) after the rapid charger 10 is connected with the rapid charging port 140 (S110).

If the second relay 130 is determined to be welded as the check result in operation S120 (S130), the apparatus for controlling the rapid charging of the vehicle controls the charging of the battery in the compensation charging sequence.

In other words, the apparatus for controlling the rapid charging of the vehicle checks a DC link voltage (S150) after controlling the first relay 120 to be on (S140) in the state that the charging connector is locked. In this case, the apparatus for controlling the rapid charging of the vehicle may set the charging connector to be locked before performing operation S140.

If the first relay 120 is on, the voltage of the battery 110 is applied to the inverter capacitor 170 to form equipotential across the inverter capacitor 170. In this case, the DC link voltage is increased by the equipotential across the inverter capacitor 170.

If the DC link voltage becomes equal to the voltage of the battery 110 (S160), the apparatus for controlling the rapid charging of the vehicle controls the first relay 120 to be off (S170). In this case, the apparatus for controlling the rapid charging of the vehicle may control the first relay 120 to be off if the DC link voltage arrives at a value within a predetermined range of the voltage of the battery 110, even if the DC link voltage is not exactly equal to the voltage of the battery 110.

The apparatus for controlling the rapid charging of the vehicle inspects for the insulation of the rapid charger (S180) if the DC link voltage is equal to the voltage of the battery 110 through operations S150 to S170. Operation S180 is to inspect an insulation resistor of the rapid charger itself before the charging is started. The apparatus for controlling the rapid charging of the vehicle measures leakage current from the rapid charger in the state that the voltage of about 500 V is applied to the rapid charger, thereby inspecting the insulation resistor of the rapid charger.

If the inspection for the insulation of the rapid charger is completed, the apparatus for controlling the rapid charging of the vehicle controls the first relay 120 to be on (S200) and starts the rapid charging of the battery 110 (S210).

Although not illustrated in FIG. 3, the apparatus for controlling the rapid charging of the vehicle may transmit the information on the welding state of the second relay 130 to an output device of the vehicle after completing the rapid charging of the battery 110. Accordingly, a driver or a vehicle manager may recognize the welding state of the second relay 130 based on information output from the output device of the vehicle.

The method for controlling the rapid charging of the vehicle according to an embodiment of the present disclosure is not limited to operations illustrated in FIG. 3. An additional operation may be provided according to a rapid charging manner.

For example, an initial charging operation of the rapid charger may be additionally performed after operation S190 is completed, if the rapid charging manner is the combo charging manner. Then, operation S200 may be performed.

Alternatively, an operation of determining whether the voltage of the rapid charger is less than 10 V is additionally performed after the second relay 130 is determined to be welded in operation S130, if the rapid charging manner is the CHAdeMO charging manner or the SGS charging manner. Thereafter, operation S140 may be performed.

If the second relay 130 is not determined to be welded (S130) as the check result of operation S120, the apparatus for controlling the rapid charging of the vehicle controls the charging of the battery in the basic charging sequence (S220).

In this case, the basic charging sequence may be a sequence of [locking the charging connector of the rapid charger→inspecting for the insulation of the rapid charger (by applying a voltage of 500 V)→(sequentially) controlling the first relay and the second relay to be on→starting charging].

In the case of the basic charging sequence, the sequence of controlling the first relay 120 and the second relay 130 to be on may be changed according to rapid charging manners, such as CHAdeMO, SGS, or combo charging manners.

In addition, the basic charging sequence may include an additional operation according to the rapid charging manners. For example, after the inspection for the insulation of the rapid charger (by applying the voltage of 500 V) is completed, an initial charging operation of the rapid charger may be added, if the rapid charging manner is the combo charging manner. In addition, an operation of determining whether the voltage of the rapid charger is less than 10 V may be added before locking the charging connector of the rapid charger, if the rapid charging manner is the CHAdeMO charging manner or the SGS charging manner.

If the charging of the battery 110 is completed in the basic charging sequence, the apparatus for controlling the rapid charging of the vehicle may diagnose the welding state of the second relay and may store the diagnosis result (S230).

Figure 4:
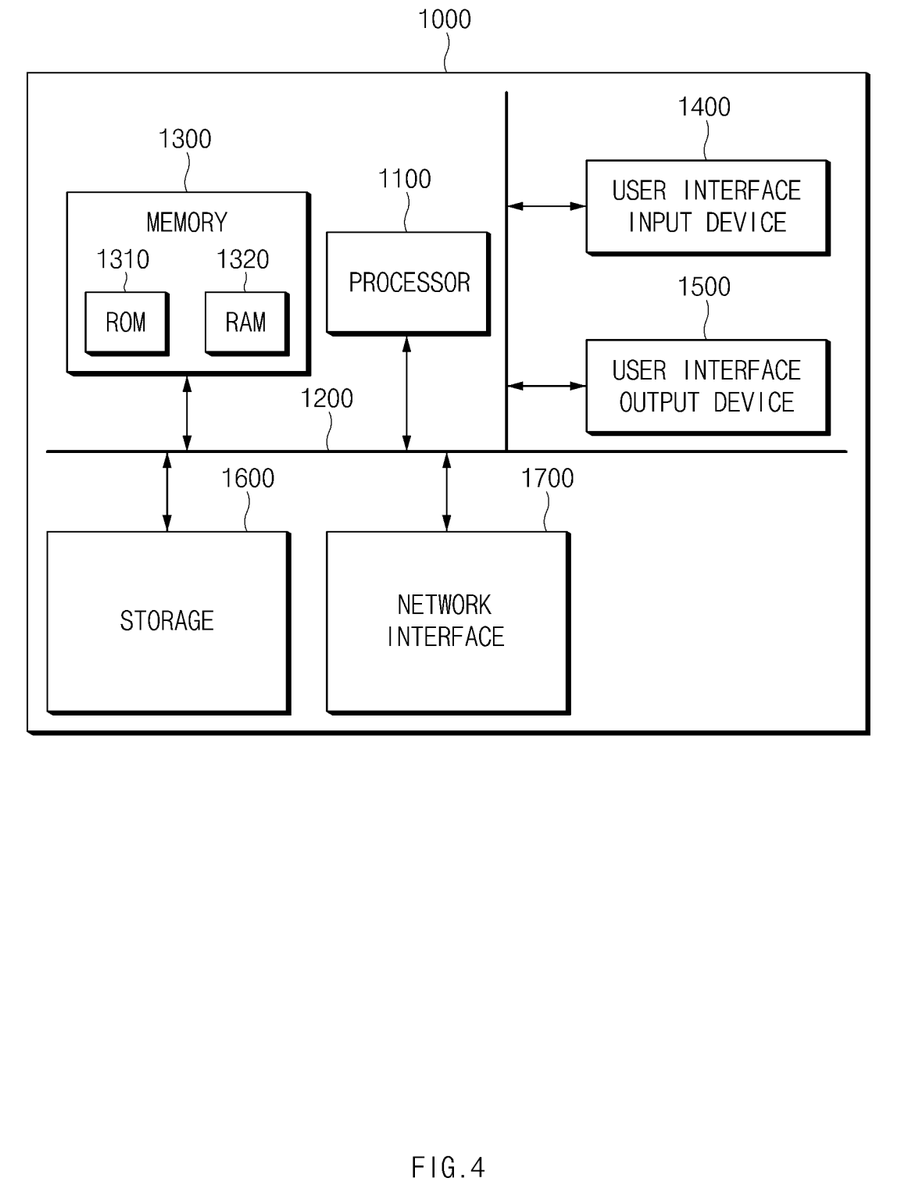
FIG. 4 is a block diagram illustrating a computing system for executing the method of FIG. 3 for controlling the charging of the battery, according to an embodiment of the present disclosure.

FIG. 4 is a block diagram illustrating a computing system for executing the method for controlling the charging of the battery, according to an embodiment of the present disclosure.

Referring to FIG. 4, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. The memory 1300 and the storage 1600 may each include various types of volatile or non-volatile storage media. For example, the memory 1300 may include a read only memory (ROM) and a random-access memory (RAM).

The operations of the methods or algorithms described in connection with the embodiments disclosed in the present disclosure may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and the storage medium may reside as separate components of the user terminal.

According to the present disclosure, the apparatus for controlling the charging of the battery employs the charging sequence to allow the charging without causing the damage to the vehicle and/or the charger even if the rapid charging relay is welded in the structure in which the main relay is series-connected with the rapid charging relay, thereby enhancing safety in the rapid charging.

Hereinabove, although the present disclosure has been described with reference to embodiments and the accompanying drawings, the present disclosure is not limited thereto. The embodiments of the present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure and are provided only for illustrative purposes. The scope of protection of the present disclosure should be construed by the attached claims, and all equivalents thereof should be construed as being included within the scope of the present disclosure.

What is claimed is:

1. An apparatus for controlling rapid charging of a vehicle, the apparatus comprising:
a battery unit including a battery, a first relay connected with the battery, and a second relay interposed between the first relay and a rapid charging port to charge the battery with charging power from a rapid charger connected with the rapid charging port, if the first relay and the second relay are controlled to be on; and
a charging controller configured to control the first relay and the second relay to be on or off, to determine a welding state of the second relay, if the rapid charger is connected with the rapid charging port, and to control charging of the battery in a charging sequence corresponding to the welding state of the second relay.

2. The apparatus of claim 1, wherein the charging controller controls the first relay to be on or off in a compensation charging sequence if the second relay is determined to be welded or controls the first relay and the second relay to be on or off in a basic charging sequence if the second relay is not determined to be welded.

3. The apparatus of claim 2, wherein the charging controller in the compensation charging sequence controls the first relay to be on in a state that a charging connector is locked, determines a DC link voltage of the battery, and controls the first relay to be off if the DC link voltage is equal to a voltage of the battery.

4. The apparatus of claim 3, wherein the charging controller determines the DC link voltage of the battery based on an equipotential value generated from an inverter capacitor parallel-connected with the first relay.

5. The apparatus of claim 3, wherein the charging controller inspects for insulation of the rapid charger after controlling the first relay to be off.

6. The apparatus of claim 5, wherein the charging controller controls the first relay to be on and starts the charging of the battery, if completely inspecting for the insulation of the rapid charger.

7. The apparatus of claim 2, wherein the charging controller, in the basic charging sequence, inspects for insulation of the rapid charger, controls the first relay and the second relay to be on, and starts the charging of the battery.

8. The apparatus of claim 1, wherein the charging controller diagnoses the welding state of the second relay and stores a diagnosis result if the charging of the battery is completed.

9. The apparatus of claim 1, wherein the charging controller determines the welding state of the second relay by calling welding diagnosis information of the second relay, and
wherein the welding diagnosis information of the second relay is stored when the charging of the battery is completed in a previous charging stage of the battery.

10. The apparatus of claim 1, wherein the charging controller receives a voltage value from a voltage sensor provided in the second relay and determines the welding state of the second relay based on the received voltage value.

11. The apparatus of claim 1, wherein the battery unit further includes an initial charging relay and an initial charging resistor, and
wherein the initial charging relay and the initial charging resistor are series-connected with each other and are parallel-connected with the first relay.

12. A method for controlling rapid charging of a vehicle, the method comprising:
determining a welding state of a second relay interposed between a first relay and a rapid charging port, if a rapid charger is connected with the rapid charging port in a state that the first relay and the second relay are connected between a battery and the rapid charging port;
controlling the first relay to be on or off in a compensation charging sequence, if the second relay is determined to be welded, or controlling the first relay and the second relay to be on or off in a basic charging sequence, if the second relay is not determined to be welded; and
controlling charging of the battery.

13. The method of claim 12, wherein the controlling of the first relay to be on or off includes:
controlling the first relay to be on in a state that a charging connector is locked;
determining a DC link voltage of the battery; and
controlling the first relay to be off in the compensation sequence, if the DC link voltage is equal to a voltage of the battery.

14. The method of claim 13, wherein the determining of the DC link voltage of the battery includes:
determining the DC link voltage of the battery based on an equipotential value generated from an inverter capacitor parallel-connected with the first relay.

15. The method of claim 13, wherein the controlling of the first relay to be on or off further includes:
inspecting for insulation of the rapid charger after controlling the first relay to be OFF.

16. The method of claim 15, wherein the controlling of charging of the battery includes:
starting the charging of the battery by controlling the first relay to be on, if completely inspecting for the insulation of the rapid charger.

17. The method of claim 12, wherein the controlling of the first and second relays to be on or off includes:
inspecting for insulation of the rapid charger; and
controlling the first relay and the second relay to be on in the basic charging sequence, if completely inspecting for the insulation of the rapid charger.

18. The method of claim 17, further comprising:
diagnosing the welding state of the second relay and storing a diagnosis result, if completing the charging of the battery.

19. The method of claim 12, wherein the determining of the welding state of the second relay includes:
determining the welding state of the second relay by calling welding diagnosis information of the second relay, wherein the welding diagnosis information of the second relay is stored when the charging of the battery is completed in a previous charging stage of the battery.

20. The method of claim 12, wherein the determining of the welding state of the second relay includes:
receiving a voltage value from a voltage sensor provided in the second relay and determining the welding state of the second relay based on the received voltage value.

* * * * *